United States Patent Office 3,161,950
Patented Dec. 22, 1964

3,161,950
ELECTRON BEAM WELDING PROCESS
Harold M. Cobb, Wallingford, Conn., assignor, by mesne assignments, to United Nuclear Corporation, New Haven, Conn., a corporation of Delaware
No Drawing. Filed Apr. 1, 1960, Ser. No. 19,146
4 Claims. (Cl. 29—471.5)

The subject invention relates to a process for forming composite structures having a zirconium metal outer layer and a metallurgically bonded inner layer. More particularly, it relates to a process for forming composite zirconium metal structures in plate form having a resistance to corrosion in high temperature water.

A long standing problem in the metal fabricating industry is that relating to the treatment of metals which are subject to corrosion in an atmosphere containing oxygen when the metal is heated to an elevated temperature. The temperature to which the metal specimen is heated will depend on the result desired to be achieved, and the metal fabrication technique employed. While it is sometimes possible to avoid the effects of oxidative corrosion or other damage to metal parts by carrying out the required heating and metal fabricating operations in special oxygen-free atmospheres, this requires a large investment in special equipment and raises the cost of the pieces fabricated.

One particular problem of this type is that relating to the fabrication of metal specimens of such metals as zirconium, titanium or hafnium, which is to be exposed to high temperature steam. Much has been published in the literature relating to this particular problem.

One example of this type of problem is described in detail in the report ANL-5629 which is published by the Office of Technical Services of the Department of Commerce in Washington, D.C.

As is evident from the above literature references in the conventional method of fabricating composite elements having zirconium sheaths a central component plate is enclosed within a container formed from component metal parts. The parts are welded to form a hermetically sealed container and this container is then evacuated and sealed in a vacuum chamber. After the sealed and evacuated container and contents are removed from the chamber they are enclosed within an outer container of steel to form a covered pack.

The whole pack is then heated to a metal working temperature and rolled to cause a reduction in thickness accompanied by an increase in length and width. When a sufficient change in dimensions has been caused in this way the component parts are found to be metallurgically bonded together. The outer container or steel cover is then removed to leave a metallurgically sound consolidated element.

While the desired result is achieved in this manner the method by which it is achieved is complex, cumbersome and costly.

Accordingly one object of this invention is to provide a less costly method of forming consolidated elements of metals subject to attack by the atmosphere when heated to elevated temperatures.

Another object is to provide a method of forming consolidated elements with an increased control over the dimensions and configuration of the element and contents thereof.

A further object is to provide a method of forming composite elements having surfaces which resist corrosive attack by high temperature water.

Other objects and advantages will be in part apparent and in part pointed out from the detailed description which follows.

In one of its broader aspects the objects of the present invention are achieved by preparing corrosion resistant composite metal specimens by a method which comprises forming said components in shapes adapted to be joined to form closed perimeters, connecting said elements by welding at said perimeters to form an evacuated enclosure internally of said shapes, heating and pressing said shapes to form a metallurgical bond between internal confronting surfaces thereof, and then removing foreign substances from the external surfaces of the formed composite specimens.

In one of its narrower aspects the objects are achieved by providing a plurality of shaped components adapted to be assembled to form a hollow rectanguloid containing a shaped piece of a core metal, joining said components by electron beam welding of the seams thereof to provide a hermetically sealed evacuated container about said core, heating and rolling said container and core to join at least a portion of the internal confronting surfaces, and removing foreign substances from the external surfaces of the formed composite element.

The manner in which these and other objects of the invention are achieved will be clear from the following examples. It will be understood that these examples are given for illustrative purposes only and are not to be interpreted as defining the scope of the invention which has been made.

*Example*

Two plates of approximately six inches in length, two and one-half inches in width and one-eighth inch in thickness were machined to form a centrally positioned recess in one face of each plate. The two plates had essentially the same shape and, when placed together to join the machined faces, formed a boxlike container. A metal core was fashioned to conform closely to the dimensions of the interior configuration of the hollow center of the container.

The container halves were assembled about the metal core and the assembly thus formed had overall dimensions of about six inches in length, two and one half inches in width and about one-quarter inch in thickness. The container halves did not provide intimate contact at all locations around the periphery and gaps of up to 0.015 inch were measured between the plates.

The assembly was then welded along the line of joining of both ends (i.e., along the two and one-half inch dimension) by inert gas tungsten arc welding. The welding apparatus was adjusted so that the fusion zone extended to a depth of about $\frac{1}{16}$ of an inch. During this welding operation copper chill plates were clamped against both surfaces of the assembly in order to confine the heat produced to the area of the weld.

After the ends were welded the assembly was placed in the vacuum chamber of a Zeiss electron beam welding apparatus. The vacuum chamber of the apparatus was evacuated in less than ten minutes to a vacuum of approximately 0.1 micron of mercury. In this evacuation step the two unsealed edges are the longer edges of the assembly and the relatively large apertures therein, as pointed out above, provide exit ports which facilitate rapid evacuation of the assembly interior.

After evacuation the two longer edges of the assembly were sealed by electron beam welding by directing the electron beam substantially perpendicularly to the sides of the assembly and essentially in the plane of the contacting surfaces of the cover plates. The welding was performed at 120,000 volts with the beam focussed to melt the confronting edges of the cover plates and to form a weldment at the line of joining between said edges. The movement of the work piece was regulated to obtain a depth of fusion of approximately 0.1 inch. The electron beam weldment overlapped that formed at the ends of the assembly by arc welding at all four corners of the piece so that an evacuated, hermetically sealed assembly was produced.

The sealed assembly was removed from the welding chamber and heated in an argon atmosphere furnace to a temperature of approximately 1450° F. The sealed assembly was then hot rolled longitudinally in a series of passes to reduce the thickness thereof from about 0.25 inch to about 0.1 inch. Between each such pass the assembly was reheated in an electric furnace maintained at a temperature of 1450° F. This hot rolling was performed to effect metallurgical bonding of the assembly components to form a consolidated element.

The hot-rolling operation resulted in the formation of surface scale primarily consisting of such foreign matter as zirconium oxide and nitride, and a small amount of foreign sub-surface contamination caused by the absorption of oxygen and/or nitrogen gases. The presence of such foreign substances on the surface of the consolidated element renders the element unsatisfactory for many uses. For example, the element cannot adequately withstand the corrosive action of high temperature water. Surprisingly it has been found that the capability of the consolidated element to resist the corrosive action of high temperature water can be restored. In accordance with the present invention this is accomplished by removal of substantially all of the foreign matter deposited or formed thereon during the consolidation operations.

A descaling operation was performed to remove surface scale. For this purpose water from a number of pressurized water sprays was directed against the surface of the element. The water used carried 100-mesh aluminum oxide abrasive particles as a slurry and was directed at high pressure at each portion of the element surface to cause a uniform wet blasting of each portion of the surface of the element.

The rate of movement of the element past the sprays was controlled to cause a removal, in addition to the scale per se of about 0.00025 inch of metal containing the absorbed oxygen, nitrogen and other foreign contaminants.

After the wet blasting operation an additional thin layer of metal about 0.001 inch thick was removed from all external surfaces of the consolidated element by pickling in an acid solution. A solution containing approximately 40% nitric acid by volume (specific gravity 1.42), 4% hydrofluoric acid (52% acid), and the balance water was satisfactory for this purpose although other acid compositions may be used.

The pickled element was then cold rolled in a series of passes through a set of rolls to reduce its thickness to a final value of 0.08 inch.

The rolled element was subjected to a number of tests. These tests included ultrasonic and radiographic inspection to determine the bonding quality and to locate any possible defects. These tests indicated that sound metallurgical bonding had resulted and that the element was free from defects such as internal voids.

A corrosion test was performed to determine if the surface of the element was resistant to corrosion. No corrosive pentration of the surface of the element occurred during a three day test in which the element was maintained in water at 680° F.

The element was sectioned at many locations and the samples were examined metallographically to determine the quality of bonding formed between the various component parts which had been consolidated into the element. In every instance excellent metallurgical bonding was found.

From the foregoing example it is evident that a novel fabrication process is made available which permits low cost fabrication of composite elements from component parts. The low cost is achieved in part by the elimination of costly steps, apparatus, and component parts previously found necessary for fabrication of elements having the properties of elements prepared as described herein.

It will be appreciated that numerous modifications can be made in the steps, components and apparatus used in carrying out the process without departing from the scope of the invention.

For example, the outer layer of metal may be composed of titanium, columbium, tantalum or a number of other metals which are selected based on the particular chemical corrosion problem sought to be overcome.

Further, the core enclosed within the outer metal layer or container may be one of a number of substances which may be deformed and bonded to the outer layer. For example, a core formed from pressing metal chips, such as zirconium metal chips, into a compact self-supporting compact may be included within the outer metal layer and may be consolidated and bonded to each other to form an internal portion of the consolidated element the external surface of which is characterized by desirable metallurgical properties discussed above.

Using this process zirconium alloy strip having desirable surface properties may be prepared by enclosing a core of clean compressed chips or powder within a hermetically sealed outer layer or container of the same alloy, and the sealed assembly may then be rolled into strip form. When this process was carried out to produce a threefold reduction in the thickness of the starting sealed assembly a consolidated product was formed which had good metallurgical bonding between all of the particle surfaces. Metallographic examination of a section of the bonded particles showed that only a very minute surface layer of oxide had been incorporated into the core metal. The oxide inclusion was insufficient to prevent use of the rolled core metal for other than a very few applications.

Other metals may also be included within the cores of these sealed assemblies. Thus the metallurgically compatible metals in Groups IVB, VIB, and VIIB of the periodic table may be included within elements prepared as described above. Alternatively, cores of substances deformable by heat and pressure as for example mixtures of particulate metals with thermally stable metal compounds such as oxides or carbides or the stable compounds themselves may be incorporated within metal sheaths by this process to provide external surface properties having the desirable properties described above.

The surface properties produced will depend of course on the treatment used in forming the consolidated element. For high temperature water applications one of the surface properties desired is the capability of forming a strongly adherent oxide film which is not subject to flaking or spalling. Specimens of consolidated elements prepared as described in the example showed no signs of deleterious corrosion reactions such as white or gray surface streaks or spots which indicate a non adherent film. Rather the entire surface exhibited a lustrous black tightly adherent thin surface oxide film.

Although, as indicated in the above example, the sealed assembly was heated in a furnace containing argon, this precaution is not necessary and the method can be carried out with heating in air both at the beginning and during the rolling operation between passes.

A number of advantages in addition to those described above may also be obtained in the practice of this invention. Thus because no steel overcladding is necessary the element may be formed from the sealed assembly by hot rolling through contour rolls or shaped rolls to give a desired cross sectional configuration to the element.

In addition grade rolling and other specialized rolling operations are made possible by this process.

Since many examples of the foregoing procedures, compositions and articles may be carried out and made, and since many modifications can be made in the procedures, compositions and articles described without departing from the scope of the subject invention, the foregoing is to be interpreted as illustrative only, and not as defining or limiting the scope of the invention.

What is claimed is:

1. The method of forming a corrosion resistant composite metal element having an outer layer of zirconium and a metallurgically bonded inner layer which comprises
   (a) forming an enclosure of at least two mating parts of zirconium,
   (b) assembling the enclosure about a core material which closely conforms to the interior configuration of the enclosure,
   (c) placing the assembled parts in a high vacuum environment,
   (d) electron beam welding the parts of the enclosure together by directing a beam of high energy electrons along the line of joining of the enclosure parts while maintaining the high vacuum environment,
   (e) subjecting the assembled parts to high pressure at an elevated temperature, and
   (f) removing foreign substances from the external surfaces of the enclosure by wet blasting with a slurry of water and particles of aluminum oxide.

2. The method of forming a corrosion resistant composite metal element having an outer layer of zirconium and a metallurgically bonded inner layer which method comprises
   (a) forming an enclosure of at least two mating parts of zirconium,
   (b) assembling the enclosure about a core material which core material closely conforms to the interior configuration of the enclosure,
   (c) placing the assembled parts in a high vacuum environment, thereby withdrawing the gases from the interior of the assembly,
   (d) electron beam welding the parts of the enclosure together by directing a beam of high energy electrons along the line of joining of the enclosure parts while maintaining the assembled parts within the high vacuum environment,
   (e) subjecting the assembled parts to high pressure at an elevated temperature, and
   (f) removing foreign substances from the external surfaces of the enclosure by wet blasting with a slurry of water and particles of aluminum oxide.

3. The method of forming a corrosion resistant composite metal element having an outer layer of zirconium and a metallurgically bonded inner layer which method comprises
   (a) forming an enclosure of at least two mating parts of zirconium,
   (b) assembling the enclosure about a core material which core material closely conforms to the interior configuration of said enclosure,
   (c) placing the enclosure with the contained core material in a high vacuum environment thereby withdrawing the gases from the interior of said enclosure,
   (d) electron beam welding the parts of the enclosure together by directing a beam of high energy electrons along the line of joining of the enclosure parts while maintaining the enclosure in the high vacuum environment,
   (e) subjecting the enclosure to high pressure at an elevated temperature, and
   (f) removing foreign substances from the external surfaces of the enclosure by wet blasting at high pressure with a slurry of water and suspended particles of aluminum oxide.

4. The method of forming a corrosion resistant composite metal element having an outer layer of zirconium and a metallurgically bonded inner layer which method comprises
   (a) forming an enclosure of at least two mating parts of zirconium,
   (b) assembling the enclosure about a core material which core material closely conforms to the interior configuration of said enclosure thereby defining an unclad enclosure,
   (c) placing the enclosure with the contained core material in a high vacuum environment thereby withdrawing the gases from the interior of said enclosure,
   (d) electron beam welding the parts of the enclosure together by directing a beam of high energy electrons along the line of joining of the enclosure parts while maintaining the enclosure in the high vacuum environment,
   (e) subjecting the unclad enclosure to high pressure at an elevated temperature, and
   (f) descaling the external surfaces of the enclosure by wet blasting at high pressure with a slurry of water and suspended particles of aluminum oxide, said particles having a size of approximately 100 mesh.

References Cited in the file of this patent

UNITED STATES PATENTS

| 2,744,314 | Kinney | May 8, 1956 |
| 2,820,751 | Saller | Jan. 21, 1958 |
| 2,915,815 | Bean et al. | Dec. 8, 1959 |

FOREIGN PATENTS

| 566,713 | Great Britain | Jan. 10, 1945 |
| 727,460 | Great Britain | Mar. 30, 1955 |
| 780,420 | Great Britain | July 31, 1957 |

OTHER REFERENCES

Steel Magazine, November 17, 1944, page 100.
Welding Engineer, April 1959 (pp. 38–40 relied on).
Welding Journal, October 1959 (pp. 401–S to 409–S relied on).